United States Patent [19]
Kedem

[11] Patent Number: 5,958,066
[45] Date of Patent: Sep. 28, 1999

[54] ON-LINE SCANNING AND MAINTENANCE OF A DISK DRIVE ARRAY

[75] Inventor: Ishai Kedem, Brookline, Mass.

[73] Assignee: EMC Corporation, Hopkinton, Mass.

[21] Appl. No.: 08/868,005

[22] Filed: Jun. 3, 1997

[51] Int. Cl.$^6$ .................................................. G06F 13/26
[52] U.S. Cl. .............................. 714/5; 714/6; 711/100; 711/114
[58] Field of Search ......................... 395/182.03, 182.04; 711/100, 114, 158

[56] References Cited

U.S. PATENT DOCUMENTS

| | | |
|---|---|---|
| 5,191,649 | 3/1993 | Cadambi et al. . |
| 5,537,566 | 7/1996 | Konno et al. . |
| 5,680,539 | 10/1997 | Jones ................................. 395/182.04 |

*Primary Examiner*—Ly V. Hua
*Attorney, Agent, or Firm*—Fish & Richardson P.C.

[57] ABSTRACT

A method and apparatus provide for maintenance and on-line scanning of the mass storage elements of a computer system without taking those elements off-line. Maintenance commands are sent to the disk drive elements during those time intervals when they are less busy with commands from the host computer(s). In a special instance, a SCSI code load update command can be implemented and forwarded to one or more disk drives connected over a SCSI bus to a disk drive controller. The disk drive controller returns busy signals to any incoming read operations. In a particular instance where there are mirrored drives, read operations can be redirected to a mirrored drive which is not being updated. The host computer system provides substantially no change in throughput performance as the maintenance operations occur.

25 Claims, 4 Drawing Sheets

ON-LINE SCANNING AND MAINTENANCE OF A DISK DRIVE ARRAY

BACKGROUND OF THE INVENTION

The invention relates generally to disk drive systems, and in particular, to the performance and maintenance of large scale disk drive systems.

Disk drive systems have grown enormously in both size and sophistication in recent years. These systems can typically include many large disk drive units controlled by a complex multi-tasking disk drive controller such as the EMC Symmetrix disk drive controller. A large scale disk drive system can typically receive commands from a number of host computers and can control a large number of disk drive mass storage units, each mass storage unit capable of storing in excess of several gigabytes of data. There is every reason to expect that both the sophistication and size of the disk drive systems will increase.

As the systems grow in complexity, so also does the user's reliance upon the system, for fast and reliable recovery and storage of data. Thus, it is more than a mere inconvenience to the user should the disk drive system go "down" or off-line; and even should only one disk drive go off-line, substantial interruption to the operation of the entire system can occur. For example, a disk drive storage unit may be part of RAID array or may be part of a mirrored system. The resulting lost time can adversely affect a system throughput performance and perceived reliability. This is true even for normally scheduled maintenance wherein, with advance warning to the user, one or more disk drives can be placed off-line for a period of time.

Many disk drive systems, such as the EMC Symmetrix disk drive system rely upon large standardized buses to connect the host computer and the controller, and to connect the controller and the disk drive elements. Periodically, however, the protocol of the system bus must be upgraded to implement performance improvements, to fix discovered programming errors, and for other normal maintenance reasons. The effect of reprogramming the disk drive communications, for example, using a SCSI bus, can be significant. Having to take the drive off-line, load into it the new SCSI code, and then bring the drive back on-line can take substantial time. During this time, the drive is effectively isolated and unavailable for any other purpose. The result can be a significant disruption to the normal operation and performance of the overall computer system.

In other instances, it is desirable to maintain a record of the operation of the disk drive by performing periodic maintenance of the drive. Again, such a function ordinarily requires the disk drive to be taken off-line, and can cause severe and undesirable interruptions to the operation and the performance of the disk drive system, and hence of the overall computer system.

SUMMARY OF THE INVENTION

The invention relates generally of effecting certain maintenance operations for a disk drive storage system without taking the disk drive units off-line. In this manner, minimal interruption to the computer system operation, and perhaps more importantly, substantially no perceptible interruptions to the computer system and can be observed even during a SCSI code load which typically required hours when the system was taken off-line.

The invention thus relates to a method and apparatus for maintaining a disk drive system having a plurality of disk drive elements. The method features the steps of monitoring at least read commands in a command sequence, to a selected disk drive element; determining intervals when maintenance operations can be performed to the selected disk drive element based upon the monitoring step, for example, without substantially interfering with the reading and writing of data from and to the selected disk drive element; inserting maintenance commands into the command sequence for execution at the selected disk drive element; and collecting any returned information from the selected disk drive element in response to executed maintenance commands. The entire operation is performed while the disk drive element remains on-line, even during the execution of the maintenance commands.

In particular aspects of the invention, the method features the steps of analyzing the collected returned information from the disk drive element, and determining whether the collected data agrees with pointers in at least one of a memory of the disk drive system and the disk drive element. In another aspect, the method features the further step of correcting, with the disk drive element on-line, those errors determined to be exist at the disk drive element and to be correctable, and marking all other determined errors at the disk drive as bad.

In another aspect of the invention, the method relates to performing maintenance operations for a disk drive system of having a plurality of disk drive elements, and features the steps of assigning high priorities to commands from host computers which are sending read and write commands for execution by the disk drive system; assigning low priorities to commands from a maintenance system for execution by the disk drive system; and executing commands received by the disk drive system, while the disk drive element is on-line, in accordance with their assigned priorities.

In a particular aspect of the invention, the maintenance function includes the updating of SCSI code in the disk drive system while the disk drive system remains on-line. The system includes a disk drive controller and a plurality of disk drive units connected to and controlled by the disk drive controller. The method features the steps of monitoring the timing of at least the read commands being sent to the disk drive units; inserting a SCSI code load command in a stream of commands being sent to the disk drive units; sending the SCSI code load command to and executing the SCSI code load command at, at least one selected disk drive unit; holding off any host computer read operations while the SCSI code load command is being executed at the disk drive units; and continuing to execute read commands from the host computers at the completion of the SCSI load command execution at the disk drive units.

In a particular aspect, the inserting step further features the steps of operating a maintenance host computer for storing a SCSI code download data in a memory of the disk drive controller; requesting, from the maintenance host computer, that the stored SCSI code be downloaded to at least one selected disk drive unit; and ensuring that all logical volumes of the selected disk drive units are in condition to receive the SCSI load command.

In another aspect of the invention, there is provided an apparatus for maintaining a disk drive system featuring a plurality of disk drive elements; a disk drive controller for controlling the disk drive elements; the controller featuring elements for (a) monitoring at least read commands in a command sequence to a selected disk drive element; (b) determining intervals where maintenance commands can be performed by the selected disk drive based upon the monitoring circuitry; (c) inserting maintenance commands into the command sequence for execution at the selected disk drive; and (d) receiving and collecting any returned information from the selected disk drive element. The disk drive element is on-line during execution of the maintenance commands.

In a particular aspect of the apparatus of the invention, the apparatus features a controller which enables a SCSI code load command to be executed while the disk drive units are on-line. The controller, in this apparatus, has elements for (a) inserting the SCSI code load command in a stream of commands being sent to the disk drive units; (b) sending the SCSI code load command to and executing the SCSI code load command at selected disk drive units; (c) holding off or delaying any host computer read operations while the SCSI load command is being executed; and (d) continuing to receive the host commands after completion of the SCSI code load command execution at the disk drive units.

In a particular embodiment, the SCSI code load command is downloaded from a maintenance host computer to a memory of the disk drive controller. Thereafter, the maintenance host computer requests the controller to download the SCSI code to at least one disk drive unit. The apparatus ensures that all logical volumes of the selected disk drive unit(s) are in condition to receive the SCSI load command.

In another aspect of the invention, the apparatus for performing a maintenance operation has a controller which assigns high priorities to commands received from host computers regarding, for example, read and write operations to be executed by the disk drive system, and low priorities to commands received from the maintenance system for execution by the disk drive system. Thereafter, the commands are executed by the disk drive system in accordance with their assigned priorities while the disk drive elements remain on-line.

The invention thus advantageously performs various maintenance features such as on-line scanning and SCSI code load without requiring the disk drives to be placed off-line. This advantageously enables the users to continue operations even during the many maintenance procedures, thus maintaining a high system responsiveness throughout its operating cycle.

BRIEF DESCRIPTION OF THE DRAWING

Other features and advantageous of the invention will be apparent from the following description taken together with the drawings in which.

DESCRIPTION OF PARTICULAR PREFERRED EMBODIMENTS

Figure 1:
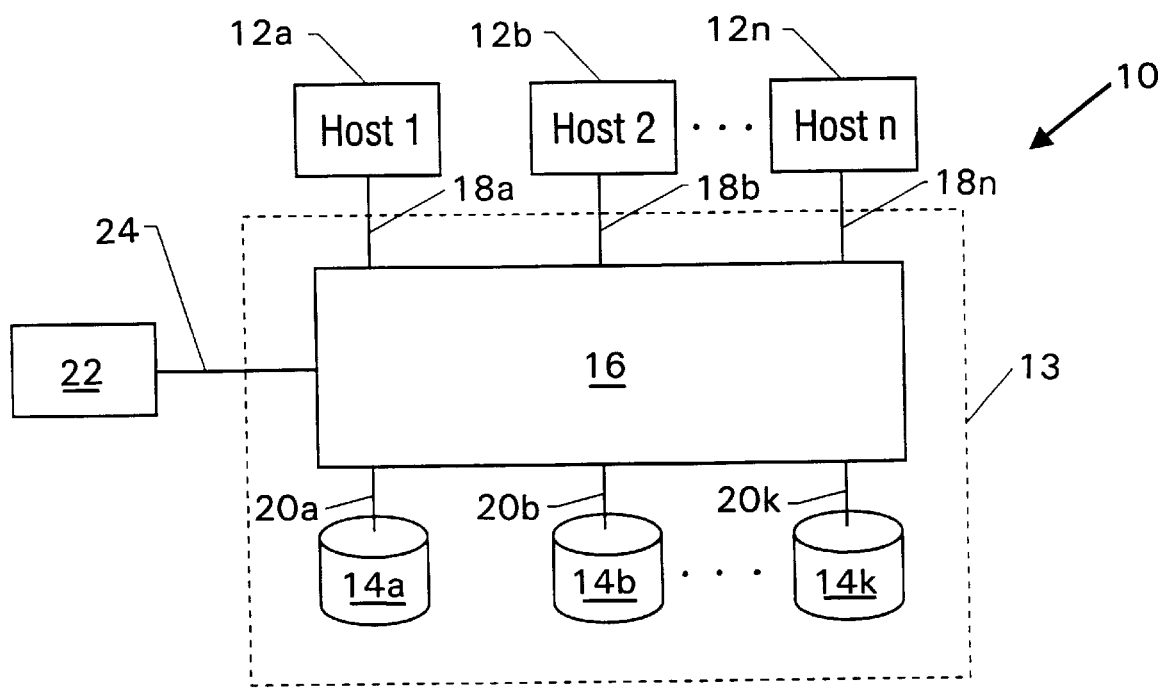
FIG. 1 is a schematic block diagram of a system in accordance with the invention.

Referring to FIG. 1, the invention relates to a computer system 10 which has a plurality of host computers 12a, 12b, . . . , 12n and a mass storage system 13 having a plurality of disk drive elements 14a, 14b, . . . , 14k. Interconnecting the host computers 12 and the disk drive elements 14 is a disk drive controller, for example, that made by EMC and known as the Symmetrix controller. The disk drive controller 16 receives memory commands from the various host computers over buses 18a, 18b, . . . , 18n respectively, for example, connected and operating in accordance with a SCSI protocol, and delivers the data associated with those commands to or from the appropriate disk drive elements 14 over respective connecting buses 20a, 20b, . . . 20k. Buses 20 also preferably operate in accordance with a SCSI protocol.

Each of the disk drive elements 14 typically has in excess of one gigabit of memory and is logically divided, in accordance with known techniques, into a plurality of logical volumes. Each disk drive element 14 can thus have a plurality of logical volumes, for example 4, 8, or more logical volumes on a single disk drive element. In a typical configuration, the controller system also connects to a console PC 22 through a connecting bus 24. Console PC 22 is used for maintenance and access to the controller and can be employed to set parameters of or initiate maintenance commands to the controller, under user control, as is well known in the art.

As indicated above, in operation, it is often desirable to perform continuing maintenance on the disk drive elements 14. In order to avoid taking a disk drive element off-line, however, the invention provides a method and apparatus for "sneaking" maintenance control commands into the disk drive controller instruction sequence or instruction list in order to provide continuous maintenance, for example, scanning of the logical volumes forming a disk drive element 14 of the array or group of disk drive elements. The maintenance commands can be executed, according to the invention, without substantially interfering with the execution of read and write commands from the hosts 12.

Figure 2:
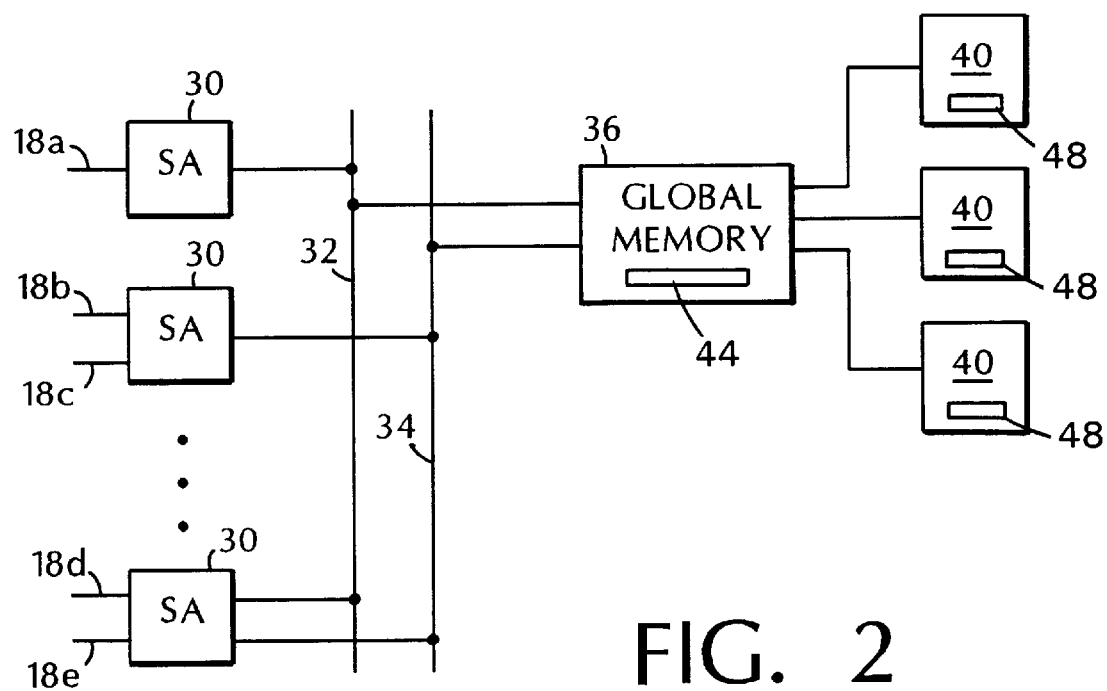
FIG. 2 is a schematic block diagram illustrating a disk controller system in accordance with the invention.

Thus, referring to FIG. 2, within a disk drive controller 16 to which the invention is particularly useful, each host computer connects to a channel director 30 (also referred to as a SCSI adapter) over the SCSI bus lines 18. Each director in turn connects over one or more system buses 32 or 34 to a global memory 36. The global memory, preferable a large memory through which the channel directors can communicate to the disk drives (through disk directors 40) is typically a large cache memory used by the system. The global memory is accessible by disk directors 40 which connect to the disk drive elements 14.

In operation, according to the invention, read and write commands from the host computers are received by the channel adapters. The channel adapters also receive other commands, in accordance with the SCSI protocol, from the host computers. The channel adapters operate upon the received commands by placing write data in the global memory or reading data from the global memory, and also generate a command sequence 44 or list of the commands to be executed. The command sequence is also placed in global memory. A separate sequence of commands is available for each disk drive unit and is executed in accordance the with instructions and data available to the disk directors 40 from global memory.

Figure 3:
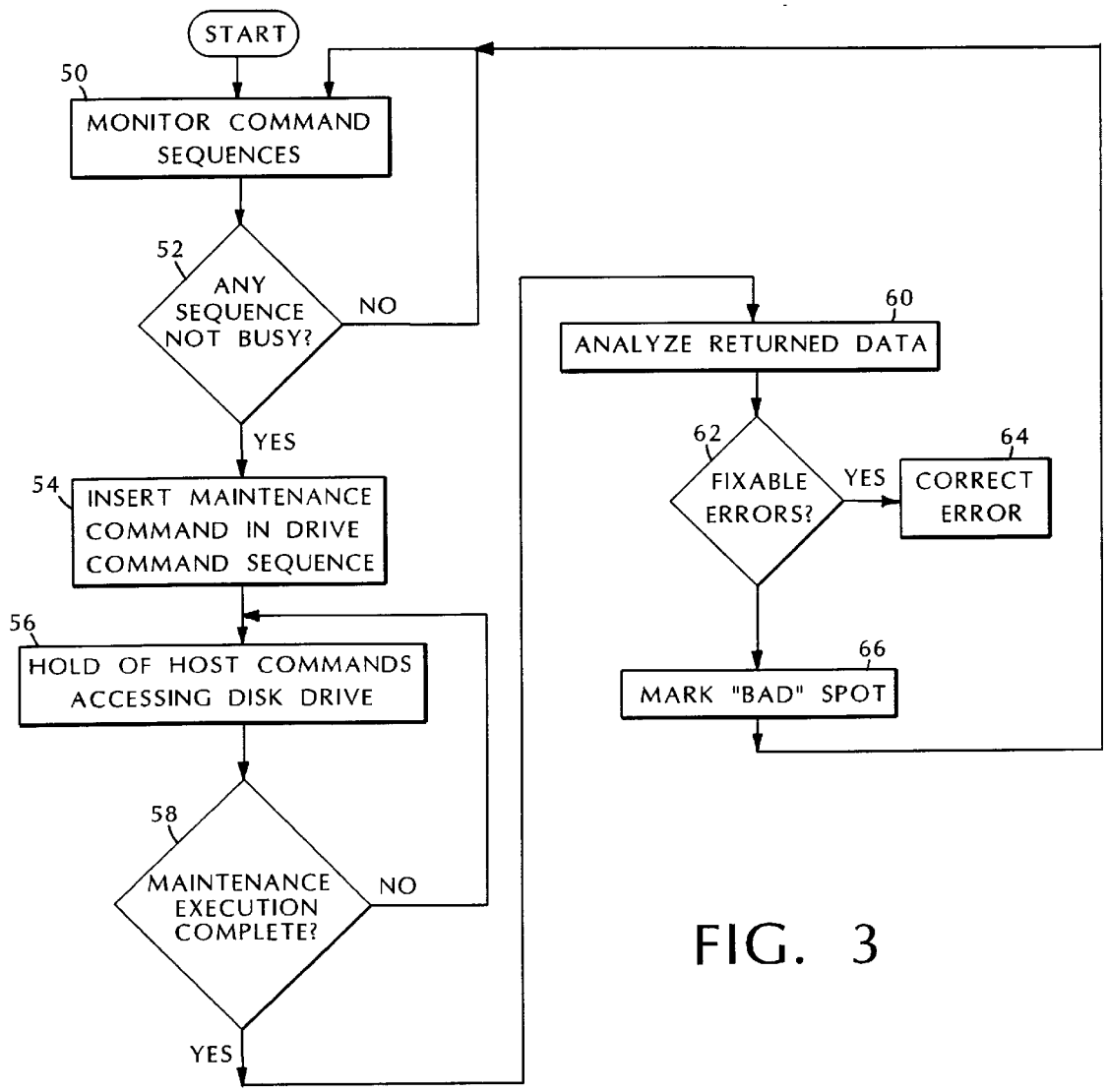
FIG. 3 is a flow chart illustrating system operation in accordance with one embodiment of the invention.

In accordance with the invention, referring to FIGS. 2 and 3, each disk director has available to it a mechanism 48 for monitoring the operation of each of the command sequences. This is indicated at step 50. In particular, a disk director recognizes when it is not "busy," that is when the activity of reading from and writing to a selected disk drive element occurs less frequently or in fact is not occurring at all. This is tested at 52. It is during this time interval, which may be only milliseconds in length, according to the invention, that the disk director will insert into the command sequence one or more maintenance command instructions to effect, for example, on-line scanning commands which will be undertaken by the drives to which those commands are made available by their respective disk director(s) (see step 54). Any read or write operations which may be input to the disk controller system from a host computer may be delayed (or held off) in execution until the maintenance command has been completed at the disk drive (step 56). For a write operation, this restriction typically is not a serious issue in devices such as the EMC Symmetrix controller in which the write data is staged in global memory prior to being written. For a read operation, however, if the disk drive element must be interrogated (that is the read data is not in cache (or global memory) the read will be delayed until the maintenance operation is completed. When the maintenance operation has been completed (step 58), the controller will analyze, at 60, the received data to determine whether any error conditions have occurred.

At step 60, particular error conditions may include a mismatching of pointers on the disk drive and in global memory. In addition, if an error occurs at 62, it will either be fixed, by the controller at 64, if it is a correctable error, or the error will be posted and marked as a bad spot at 66. In addition, in those instances where the data is mirrored in some way for example through a RAID approach, or in other circumstances, the error will be corrected on-line, if possible. The correction process will be performed in parallel with continuing reads and writes from host computers to the affected disk drive or drives.

Figure 4:
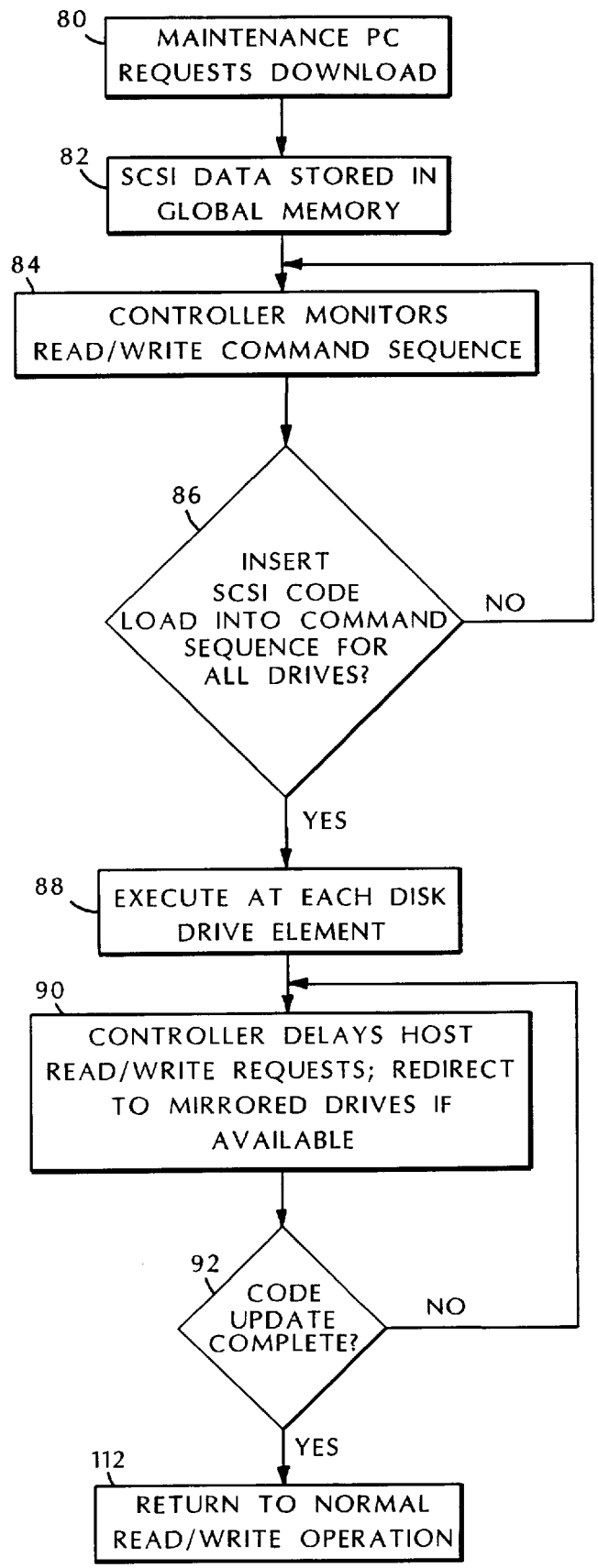
FIG. 4 is a flow chart illustrating system operation in accordance with another embodiment of the invention.

Referring now to FIG. 4, in a special but important instance of on-line maintenance, the disk drive system provides for a SCSI code load update without rendering the disk drive to be updated to an off-line state. It is the maintenance computer 22 which will initiate the on-line upgrade of the SCSI code load data at user (usually a customer engineer) request. Further, the SCSI code load data, which can be approximately 250,000 bytes is stored in the global memory. This data will have been placed in global memory, typically, from the PC maintenance computer. Then, at 84, in accordance with the invention, the controller monitors the timing of the read and write commands being sent to the disk drive unit, and the read commands in particular. If a less "busy" time interval is identified, the controller will insert a SCSI code load command into the sequence of commands being sent to the disk drive unit. This is indicated at 86. In particular, multiple disk drive units can be affected; and preferably, all units which are or will be affected are updated at the same time. Thereafter, the SCSI code load command is sent to and is executed (at 88) at each affected disk drive element. While the disk drive element is executing the code load command, the disk drive controller will delay (at 90) any host computer read or write operation requiring access to the updating disk drive element. In a preferred embodiment, for the EMC Symmetrix controller system, the disk drive upgrade can take up to 60–70 seconds. During this time, write commands are advantageously stored in global memory.

Once the disk drive elements have completed the code load update at 92, operation of the disk drive controller returns to normal and further reads (and writes) from (and to) the disk drive elements can be executed, as indicated at 112.

The controller will also, under the circumstances of SCSI load upgrade, ensure that when the SCSI load command is sent to the disk drive elements, each logical volume of each digital disk drive element to be effected will be in a correct state to receive the updated information. Further, as noted at 114, when a disk drive element is unavailable due to the upload condition, if there is another source of data, such as a mirrored drive, the read or write request will be rerouted to the mirrored drive and the data will then be updated after the code load maintenance request has been completed. This is indicated at 90.

In other embodiments of the invention, the maintenance PC, in addition to initiating a maintenance command for a single disk drive element, can identify groups of disk drive elements to be effected by a single command. In this instance, the maintenance PC operates to create the necessary commands for each disk director, and monitors the operation of each command sequence for each particular disk drive. In addition, in other embodiments of the invention, the function of the maintenance PC can be effected by the host computer so that a request to perform on-line scanning or a SCSI code load update can be initiated by one or more of the host computers, for example, if the host computer, or the user, recognizes that the wrong version of SCSI code is running on a disk drive element or if errors are apparent to the host computer.

Accordingly, a disk drive element can be scanned for errors while it is on-line without adversely substantially affecting operations at the host computer system. In addition, as a special case of the maintenance procedure, a SCSI code load can be effected without taking any disk drive element off-line.

Additions, subtractions, and other modifications of the described invention will be apparent to those practiced in this field and are within the scope of the following claims.

What is claimed is:

1. A method for maintaining a disk drive system having a plurality of disk drive elements, comprising the steps of monitoring at least read commands, in a command stream, to a selected disk drive element, determining intervals when maintenance operations can be performed to said selected disk drive element based upon occurrences of at least said read commands in said monitoring step, inserting maintenance commands into said command stream for execution at said selected disk drive element, and collecting any return information from said selected disk drive element in response to executed maintenance commands, wherein said selected disk drive element remains on-line during execution of said maintenance commands.

2. The method of claim 1 further comprising the steps of analyzing said collected return information, and with said selected disk drive element on-line, determining whether the collected data agrees with pointers on at least one of a memory of the disk drive system, and the selected disk drive element.

3. The method of claim 2 further comprising the steps of correcting, with said selected disk drive element on-line, correctable errors determined to exist at the selected disk drive element, and marking all other determined errors, at the selected disk drive element, as bad.

4. A method for performing maintenance operations for a disk drive system, having a plurality of disk drive elements, comprising the steps of assigning high priorities to commands from host computers sending read and write commands for execution by the disk drive system, assigning low priorities to commands from a maintenance system for execution by the disk drive system, and executing commands at said disk drive system, while said disk drive elements are on-line, in accordance with their assigned priorities.

5. The method of claim 4 further comprising the steps of collecting any returned information from said disk drive elements in response to said commands from a maintenance system, analyzing said collected returned information, and with said disk drive elements on-line, determining whether the collected data agrees with pointers on at least one of a global memory and the disk drive elements.

6. The method of claim 5 further comprising the steps of correcting, with said disk drive elements on-line, correctable errors determined to exist at the disk drive elements, and marking all other determined errors as bad.

7. A method for maintaining a disk drive system having a disk drive controller, the controller receiving commands from at least one host computer and writing to and reading from a plurality of disk drive units, said controller having a cache memory for storing disk data, including disk write operations, said method comprising the steps of:

monitoring at least the read operations pending in a disk command sequence, determining when a maintenance command operation can be performed without interfering substantially with the reading and writing of data from and to a selected disk drive unit, inserting a maintenance command operation into said command sequence for execution at said selected disk drive unit without substantially interfering with at least host computer initiated read operations to said selected disk drive unit;

collecting data resulting from execution of said maintenance command operation, and maintaining said selected disk drive unit on-line during execution of said maintenance command operation.

8. The method of claim 7 further comprising the steps of analyzing the collected data resulting from execution of said maintenance command operation, and with said selected disk drive unit on-line, determining whether the collected data agrees with pointers on at least one of said cache memory and the selected disk drive unit.

9. A method for updating the SCSI code in a disk drive system having a disk drive controller and a plurality of disk drive units, said method comprising the steps of monitoring the timing of at least the read commands being sent to said disk drive units, inserting a SCSI code load command in a stream of commands being sent to said disk drive units, sending said SCSI code load command to and executing said SCSI load command at at least one selected disk drive unit, holding off any host computer read operations while said SCSI code load command is being executed, and continuing to execute read commands from said host commands after completion of said SCSI code load command execution at said disk drive units.

10. The method of claim 9 wherein the inserting step further comprises the steps of operating a code maintenance host computer for storing a SCSI download data in a memory of the disk drive controller, requesting, from the maintenance host computer, that the stored SCSI code be downloaded to said at least one selected disk drive unit, and ensuring that all logical volumes of the selected disk drives are in condition to receive the SCSI code load.

11. The method of claim 9 further comprising the steps of disconnecting, temporarily, said selected disk drive units upon receipt of said SCSI code load, and delaying if necessary any response to any host computer requesting operations from said disconnected selected disk drive units.

12. The method of claim 9 further comprising the steps of mirroring data stored in said disk drive units, and when said selected disk drive is in a disconnected state, providing data from its mirrored drive unit in response to a host computer request to the disconnected drive unit.

13. Apparatus for maintaining a disk drive system comprising a disk drive controller, a plurality of disk drive elements connected to and controlled by the controller, said controller comprising monitoring circuitry for monitoring at least read commands in a command sequence for a selected disk drive element, circuitry for determining intervals when maintenance commands can be performed for said selected disk drive element based upon the results of the monitoring circuitry, circuitry for inserting maintenance commands into the command sequence for execution by the selected disk drive element, and circuitry for receiving and collecting any return information from the selected disk drive element, wherein the selected disk drive element is on-line during execution of the maintenance commands.

14. The apparatus of claim 13 further comprising, at the controller, analysis circuitry for analyzing the collected returned information from the selected disk drive elements, and with the selected disk drive elements maintained on-line, circuity determining whether the collected data agrees with pointers on at least one of a controller memory and the selected disk drive elements.

15. The apparatus of claim 13 further comprising, at the controller, circuitry for correcting, with the selected disk drive element on-line, correctable errors determined to exist at the selected disk drive element, and circuitry for marking all other determined errors at the selected disk drive element as bad.

16. An apparatus for performing maintenance operations for a disk drive system comprising a disk drive controller, a plurality of disk drive elements connected to and driven by the controller, the controller having circuitry responsive to host generated commands for assigning high priorities to the host generated commands, the commands including read and write commands for execution by the disk drive system, circuitry for assigning low priorities to commands from a maintenance host system for execution by the disk drive system, and circuitry for executing the commands at the disk drive system while the disk drive elements are in an on-line condition, in accordance with the assigned priorities attached to the commands by the controller.

17. The apparatus of claim 16 further comprising analysis circuitry for analyzing any collected returned information from the disk drive system, and with the disk drive elements maintained on-line, circuity determining whether the collected data agrees with pointers on at least one of a controller memory and the disk drive element.

18. The apparatus of claim 17 further comprising circuitry for correcting, with the disk drive elements on-line, any correctable errors determined to exist at the disk drive elements, and circuitry for marking all other determined errors at the disk drive elements as bad.

19. An apparatus for maintaining a disk drive system comprising a disk drive controller receiving commands from at least one host computer and writing to and reading from a plurality of disk drive units, said controller having a cache memory for storing disk data, said controller monitoring at least the read operations pending a disk command sequence in said disk drive controller, said controller determining when a maintenance command operation can be performed without interfering substantially with the reading and writing of data from and to a selected disk drive unit, said controller receiving and inserting a maintenance command operation into said command sequence for execution at said selected disk drive unit without substantially interfering with at least host computer initiated read operations to said selected disk drive unit, said controller collecting any data resulting from execution of said maintenance command operation, and said controller maintaining said selected disk drive unit on-line during execution of said maintenance command operation.

20. The apparatus of claim 19 wherein said controller further comprises circuitry analyzing the collected returned data, and with said selected disk drive unit on-line, determining whether the collected data agrees with pointers on at least one of said cache memory and said selected disk drive unit.

21. The apparatus of claim 20 further comprising said controller correcting, with said selected disk drive unit on-line, correctable errors determined to exist at the selected disk drive unit, and said controller marking all other determined errors at the selected disk drive unit as bad.

22. An apparatus for updating a SCSI code in a disk drive system comprising a disk drive controller, a plurality of disk drive units connected to and controlled by the disk drive controller, the controller monitoring the timing of at least read commands being sent to the disk drive units, the controller inserting a SCSI code load command in a stream of commands being sent to the disk drive units, the controller sending the SCSI code load command to and executing the SCSI code load command at selected disk drive units, the controller holding off any host computer read operations while said SCSI code load command is being executed, and the controller continuing to receive the host commands after completion of the SCSI code load command execution at the selected disk drive units.

23. The apparatus of claim 22 further comprising a maintenance computer, the controller operating, in response to input from the maintenance computer, for storing a SCSI code download data in a memory of the disk drive controller, the maintenance computer requesting to the controller that the downloaded SCSI code be downloaded to at least one selected disk drive unit, and the controller ensuring that all logical volumes of the selected disk drive units are in condition to receive the SCSI code load.

24. The apparatus of claim 23 further comprising, at the controller, circuitry disconnecting, temporarily, the selected disk drive units upon receipt of the SCSI code load by the selected disk drive units, and circuitry delaying, if necessary, any response to a host computer requesting operations from the temporarily disconnected disk drive units.

25. The apparatus of claim 24 further comprising at least a portion of the disk drive units forming mirrored disk drive units, said controller mirroring data stored in said disk drive units, and said controller, when said requested disk drive is a disconnected state, providing data from its mirrored disk drive unit in response to a host computer request to the disconnected unit.

* * * * *